Patented Aug. 7, 1934

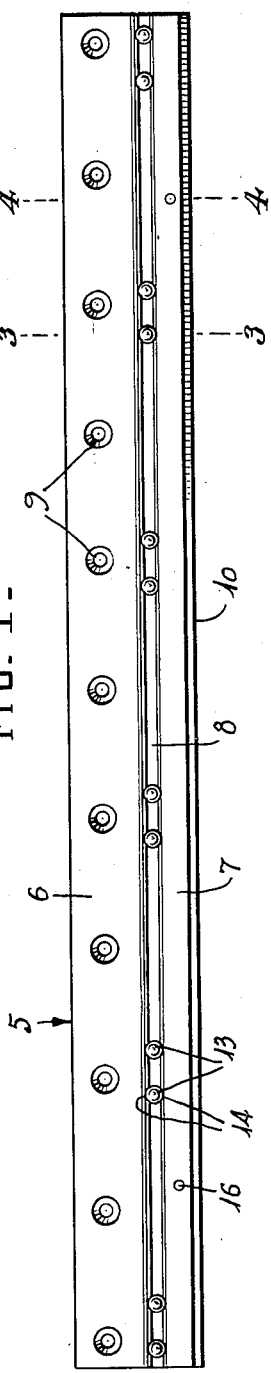
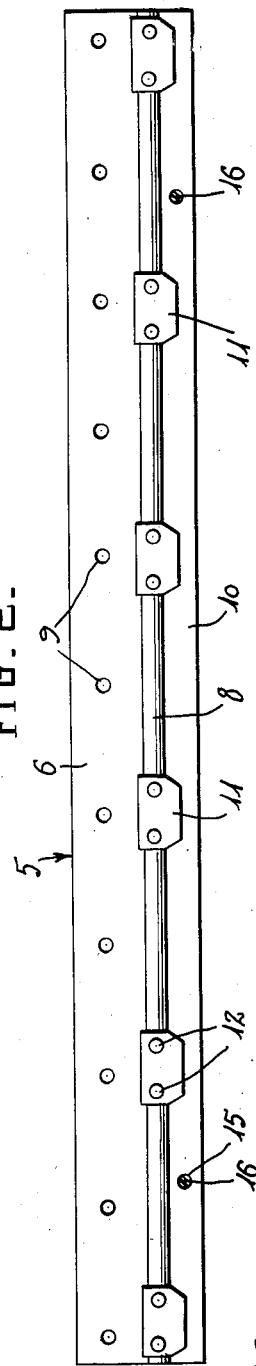
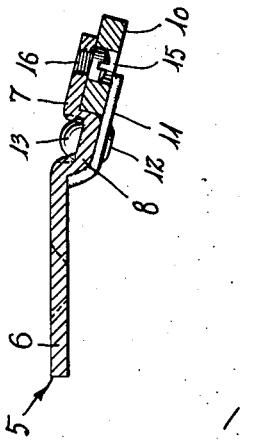
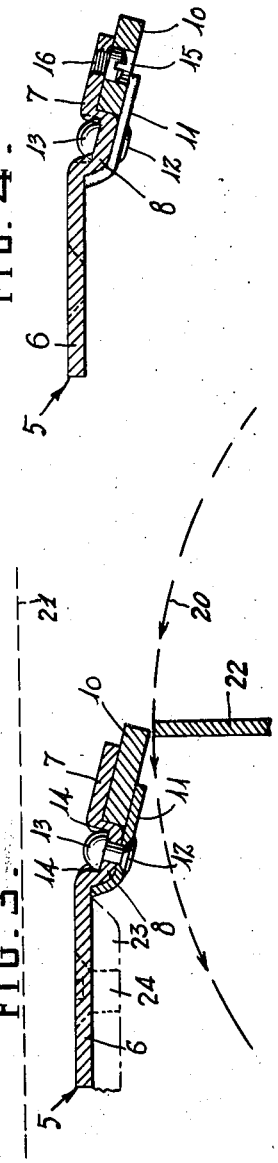

1,969,103

UNITED STATES PATENT OFFICE 1,969,103

LAWN MOWER BLADE

John Sheridan, Chagrin Falls, Ohio

Application November 4, 1930, Serial No. 493,388

5 Claims. (Cl. 56—294)

The present invention relates to lawn mower blades, and aims to provide a novel and improved blade having a reversible double edged cutting bar or strip, which will double the life of the blade.

Another object of the invention is the provision of a mower blade comprising a novel assembly of a cutter bar and body plate, in order to securely hold the bar to the plate and to permit the bar to be removed.

With the foregoing and other objects in view, which will be apparent as the description proceeds, the invention resides in the construction and arrangement of parts, as hereinafter described and claimed, it being understood that changes can be made within the scope of what is claimed without departing from the spirit of the invention.

The invention is illustrated in the accompanying drawing, wherein—

Figure 1 is a plan view of the improved blade.

Fig. 2 is a bottom plan view thereof.

Figs. 3 and 4 are enlarged cross sections on the respective lines 3—3 and 4—4 of Fig. 1.

The blade comprises an elongated sheet-metal plate 5, constituting the body of the blade, and having the edge or body portion 6 and the edge portion 7, with a longitudinal offset or channel portion 8 between said portions 6 and 7. The portion 6 has apertures 9 to receive screws, bolts or other securing elements 24 for fastening the blade on its mounting 23.

A cutting bar or strip 10 of suitable metal overlaps the portion 7 of the plate 5 and its inner edge abuts the offset 8, while its outer edge projects beyond the portion 7 to shear across the rotary cutter blade 22 of the mower as usual. The portion 7 of the plate 5 is preferably at an obtuse angle to the portion 6 so as to give the cutting bar 10 the proper angle. Figure 3 shows the path 20 of the rotary cutter blade 22 while line 21 indicates the surface of the ground.

Metal clips 11 extend across and behind the offset 8 and project from said offset to overlap the bar 10, for holding the bar against the portion 7, said bar being readily slipped between the portion 7 and clips 11. The clips 11 are secured to the offset 8 by means of rivets 12 or other securing elements which have heads 13 seated in said offset, the walls of the offset having indentations or recesses 14 to receive the heads which are of greater diameter than the width of the groove or channel of said offset.

The bar 10 has apertures 15 receiving the heads of screws 16 which are threaded into the portion 7, thereby holding the bar 10 firmly in place. These screws may be withdrawn to release the bar so that it can be removed, and the bar may be reversed so as to employ either edge thereof. The bar may be reversed edge for edge or end for end.

The structure is simple, being convenient and economical to manufacture, and the blade is rugged in construction so as to withstand the wear and tear to which it is subjected in use.

Having thus described the invention, what is claimed as new is:

1. A mower blade comprising a plate, a cutter bar overlapping one edge porton thereof, clips on the plate overlapping said bar, and screws threaded in said plate, said bar having apertures receiving said screws.

2. A mower blade comprising a plate having an offset, a cutter bar overlapping one edge portion of said plate and abutting said offset, and clips secured to said offset and overlapping said bar.

3. A mower blade comprising a plate having an offset, a cutter bar overlapping one edge portion of said plate and abutting said offset, clips secured to said offset and overlapping said bar, and screws threaded in said plate, said bar having apertures receiving said screws.

4. A mower blade comprising a plate having an offset, a cutter bar overlapping one edge portion of said plate and having one edge abutting said offset, clips extending across said offset and overlapping said bar, and securing elements between said clips and offset having heads seated in said offset.

5. A mower blade comprising a body, a cutter bar, said body having portions overlapping the opposite sides of the bar, and screws threaded in said body, said bar having apertures receiving said screws.

JOHN SHERIDAN.